: US005768248A

United States Patent [19]
Lee

[11] Patent Number: 5,768,248
[45] Date of Patent: Jun. 16, 1998

[54] PICKUP POSITION AND TILT ADJUSTING APPARATUS OF A DISK PLAYER

[75] Inventor: Hyun-woo Lee, Suwon, Rep. of Korea

[73] Assignee: Samsung Electronics Co., Ltd., Kyungki-Do, Rep. of Korea

[21] Appl. No.: 684,206

[22] Filed: Jul. 19, 1996

[30] Foreign Application Priority Data

May 17, 1996 [KR] Rep. of Korea .................. 96-16743

[51] Int. Cl.$^6$ ................................. G11B 21/24
[52] U.S. Cl. ................. 369/219; 369/215; 369/249
[58] Field of Search ........................... 369/215, 219, 369/244, 75.2, 249, 255; 360/106, 109

[56] References Cited

U.S. PATENT DOCUMENTS

| | | | |
|---|---|---|---|
| 3,770,905 | 11/1973 | Sperry | 360/109 X |
| 4,996,619 | 2/1991 | Negishi et al. | 360/109 |
| 5,172,361 | 12/1992 | Urushibata et al. | 369/77.1 |
| 5,172,367 | 12/1992 | Hinotani | 369/215 |

Primary Examiner—Stuart S. Levy
Assistant Examiner—William R. Karzuch
Attorney, Agent, or Firm—Sughrue, Mion, Zinn, Macpeak & Seas, PLLC

[57] ABSTRACT

A pickup position and tilt adjusting apparatus of an optical disk player includes at least one guide rail installed on a deck for supporting and guiding a pickup, at least one position adjusting unit for horizontally moving one end of the guide rail with respect to a disk surface, and at least one tilt adjusting unit for vertically moving the other end of the guide rail with respect to the disk surface.

10 Claims, 4 Drawing Sheets

PICKUP POSITION AND TILT ADJUSTING APPARATUS OF A DISK PLAYER

BACKGROUND OF THE INVENTION

1. Field of the Invention

The present invention relates to a pickup position and tilt adjusting apparatus of an optical disk player for adjusting the position and tilt of a pickup so that optimal pickup positioning is obtained between the pickup and a disk.

2. Description of the Related Art

FIG. 1 shows the pickup portion of a conventional optical disk player in which a turntable 2 for receiving a disk (not shown) is installed at one side of a deck 1, and a parallel pair of guide rails 3 are fixedly supported by fixing portions 10 next to the turntable 2. A pickup 5 is slidably supported on the guide rails 3 to be movable along the guide rails 3. A tooth gear portion (not shown), for engaging with a screw shaft 8, is formed at one side of the pickup 5. Accordingly, when the screw shaft 8 is rotated by the driving of a motor 4, the pickup 5 moves in a radial direction of the disk to reproduce information recorded on the disk in a known manner while moving along the guide rails 3.

In order to reproduce information recorded on the disk properly, the pickup 5 must move radially in a straight line from the center of the disk, and the plane of the disk and the plane of movement of the pickup 5 along the guide rails 3 should be parallel. Generally, the pickup 5 deviates from the radial path from the disk center or is tilted with respect to the plane of the disk due to manufacturing errors.

Though these errors can be minimized by increasing the accuracy in parts design and product assembly, there is a practical limit to reducing these errors without reducing the assembly efficiency of the device.

Furthermore, since an additional means for correcting these errors after assembly is not provided in the typical disk player, such errors are corrected only by the focusing and tracking functions of the pickup 5. However, excessive control of the focusing and the tracking servo is required to correct positional errors thus rendering the reproduction of information on a disk unstable.

SUMMARY OF THE INVENTION

To solve the above problems, it is an object of the present invention to provide a pickup position and tilt adjusting apparatus of an optical disk player which enables accurate adjustment of the position and tilt of a pickup by moving guide rails that support the pickup.

Accordingly, to achieve the above object, there is provided a pickup position and tilt adjusting apparatus of an optical disk player which includes a pair of guide rails installed on a deck for supporting and guiding a pickup, at least one position adjusting unit for horizontally moving one end of at least one guide rail with respect to a disk surface, and at least one tilt adjusting unit for vertically moving the other end of the guide rail with respect to the disk surface.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 1:
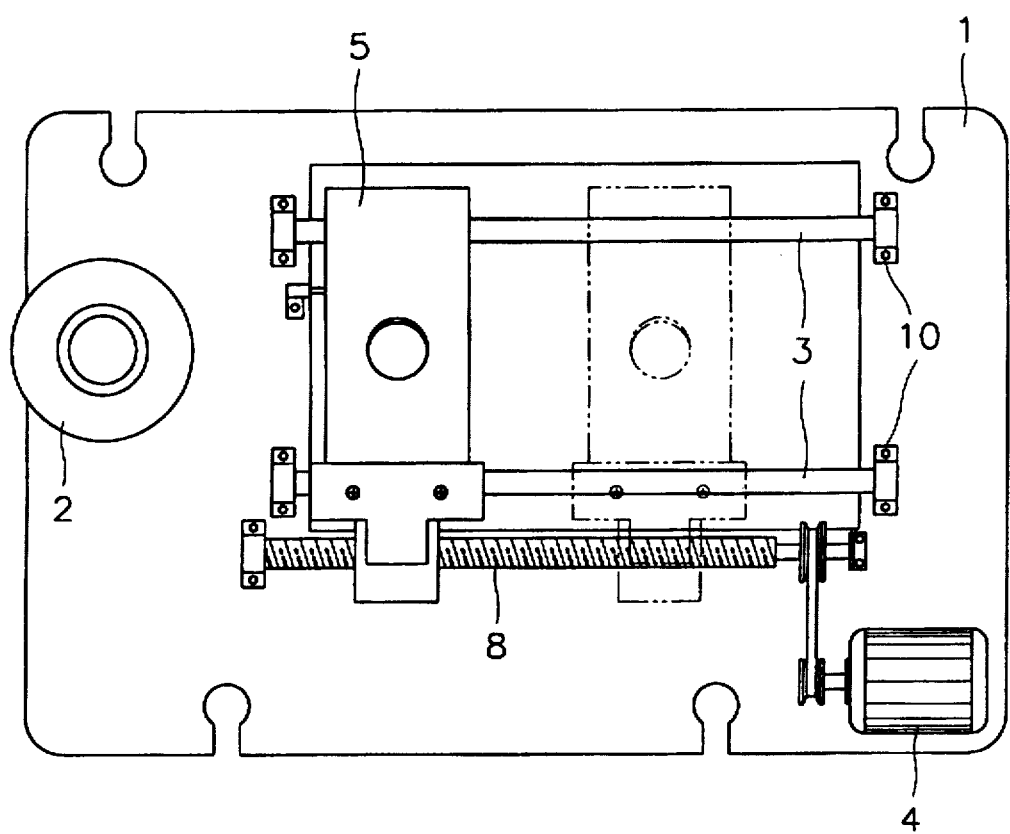
FIG. 1 is a plan view illustrating a conventional disk player.
Figure 2:
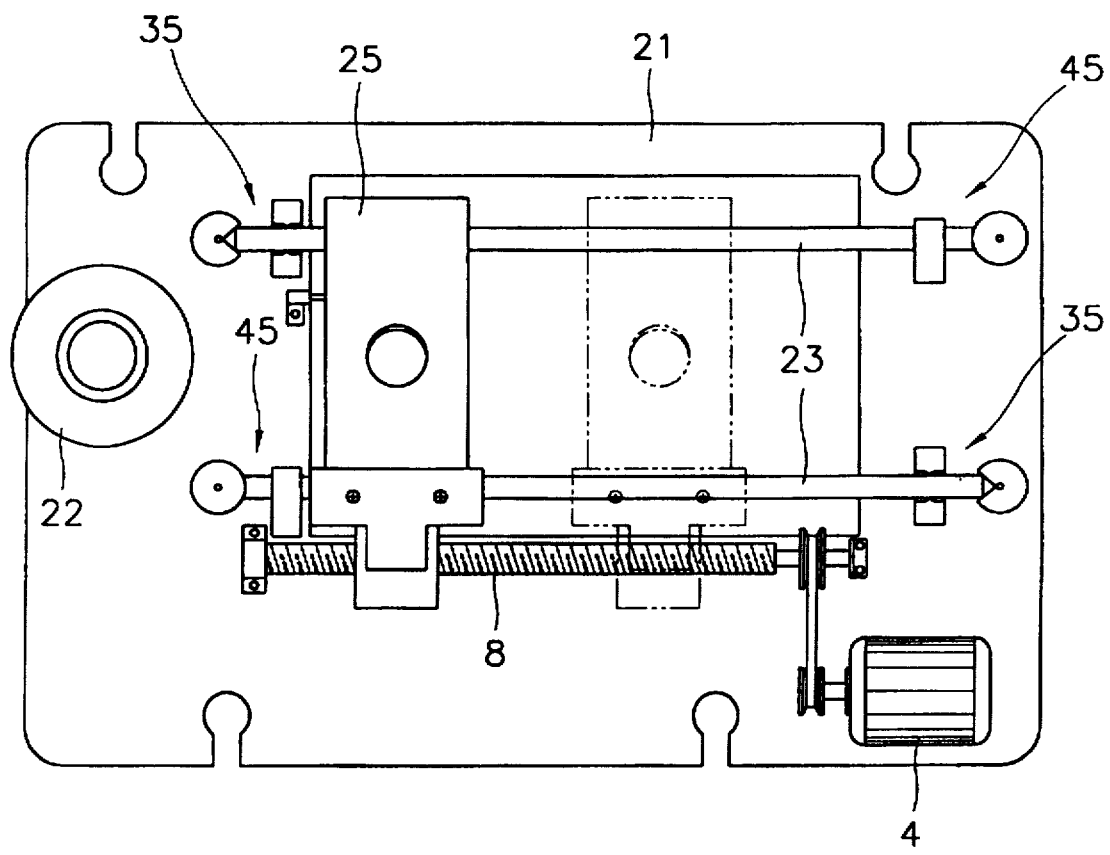
FIG. 2 is a plan view illustrating an optical disk player equipped with a pickup position and tilt adjusting apparatus according to the preferred embodiment of the present invention.

FIG. 2 shows an optical disk player equipped with a pickup position and tilt adjusting apparatus according to the preferred embodiment of the present invention. A turntable 22, for receiving a disk (not shown), is installed at one side of a deck 21, and a pair of guide rails 23 for supporting a pickup 25 are provided next to the turntable 22. One end of each guide rail 23 is supported by a position adjusting means 35 and the other end of each guide rail is supported by a tilt adjusting means 45.

Figure 3:
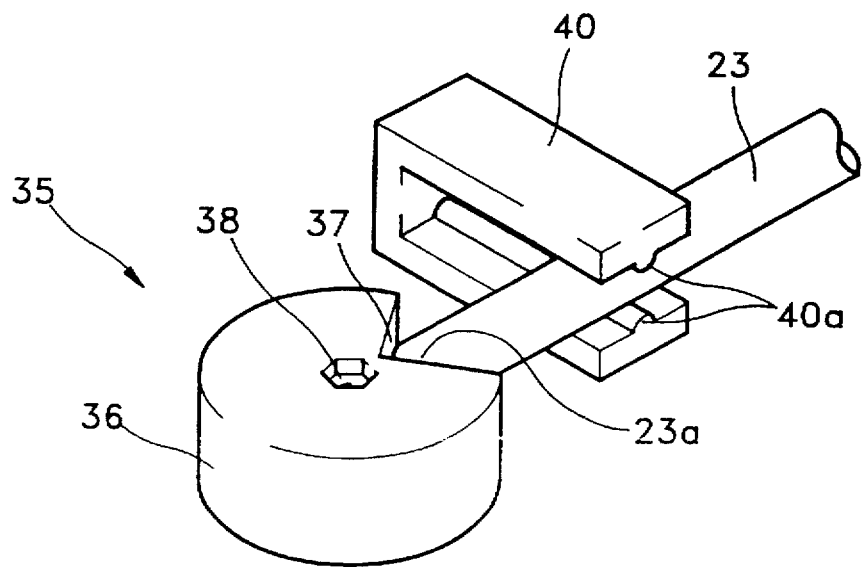
FIGS. 3 and 4 are perspective and plan views, respectively, illustrating a position adjusting means of the pickup position and tilt adjusting apparatus according to the preferred embodiment.
Figure 4:
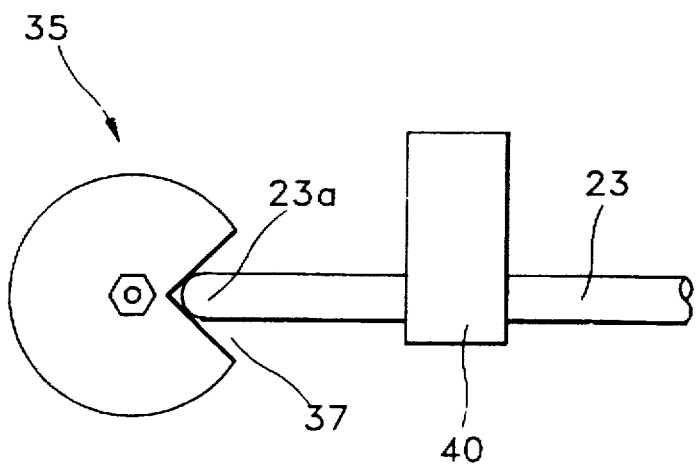

The position adjusting means 35 is illustrated in detail in FIGS. 3 and 4. The position adjusting means 35 includes a horizontal guide block 40 for supporting and guiding horizontal movement of the guide rail 23, and a position adjusting block 36 for moving an end portion of the guide rail 23 horizontally with respect to a disk (not shown) surface when the disk is seated on turntable 22.

Horizontal guide bumps 40a, which contact the upper and lower surfaces of the guide rail 23 so that the contact surface area is minimal, are formed lengthwise on the horizontal guide block 40. The guide rail 23 supported by the horizontal guide bumps 40a can move horizontally with respect to the seated disk. The horizontal guide block 40 also allows the guide rail 23 to pivot vertically, i.e. in a direction perpendicular to the surface of a seated disk, at infinitesimal angles around a contact point of the horizontal guide bumps 40a.

The position adjusting block 36 is rotatably installed on the deck 21 (see FIG. 2). The position adjusting block 36 preferably is formed by a cylindrical block having a cut-out sector 37. A rounded end portion 23a of the guide rail 23 is inserted into the cut-out sector 37. A hexagonal groove 38 is provided on the upper surface of the position adjusting block 36 so that the position adjusting block 36 can be rotated by an Allen wrench or any other appropriate tool.

In the position adjusting means 35 having such a structure, when the position adjusting block 36 is rotated, the guide rail 23, of which end 23a is inserted into the cut-out sector 37, is moved by a predetermined distance in a horizontal direction with respect to the disk. This horizontal movement of the guide rail 23 is guided by the horizontal guide bumps 40a of the horizontal guide block 40. Accordingly, the position of the pickup 25 (see FIG. 2) supported by the guide rails 23 can be adjusted so that a laser beam emitted from the pickup 25 may be accurately incident on the surface of the disk. This accuracy can be determined by known instruments.

Figure 5:
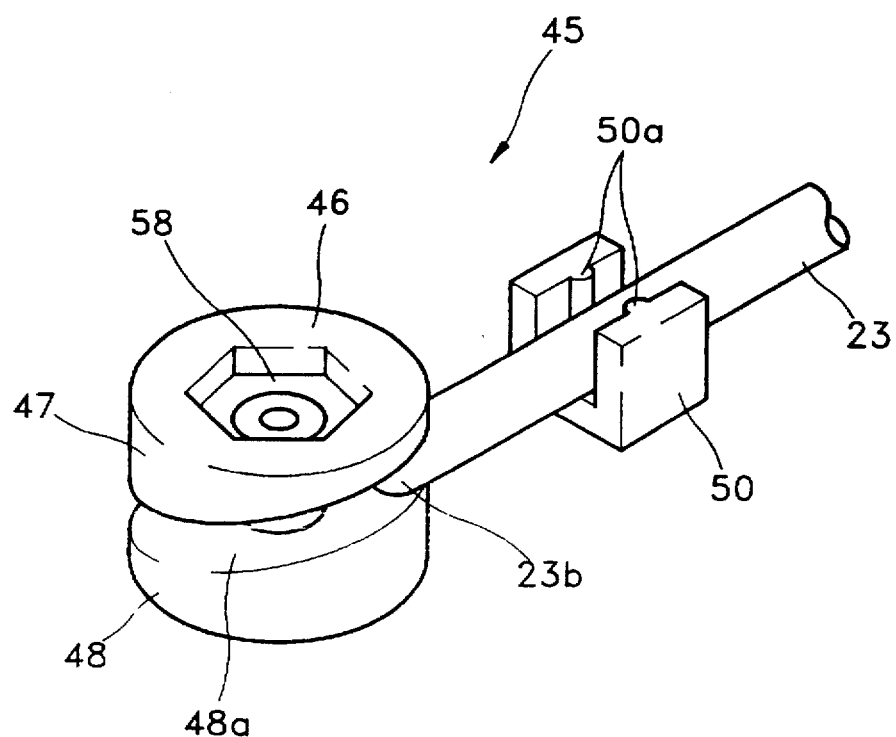
FIGS. 5 and 6 are perspective and plan views, respectively, illustrating a tilt adjusting means of the pickup position and tilt adjusting apparatus according to the present invention.
Figure 6:
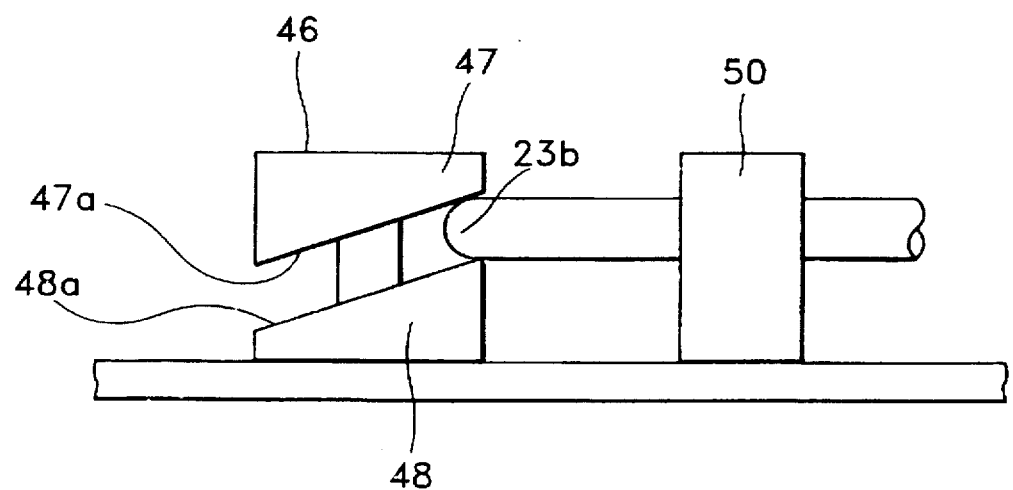

The tilt adjusting means 45 of the preferred embodiment will be described with reference to FIGS. 5 and 6. The tilt adjusting means 45 is installed at the other end of each guide rail 23, i.e. the end that is opposite the position adjusting means 35 (see FIG. 2), and comprises a vertical guide block 50 for supporting the guide rail 23 and allowing vertical movement thereof and a cam member 46 for moving an end portion 23b of the guide rail 23 in a vertical direction with respect to the disk surface. The cam member 46 has a narrow spiral channel formed therein.

Vertical guide bumps 50a, which contact both sides of the guide rail 23 so that the contact surface area is minimal, are formed on the vertical guide block 50. The guide rail 23 supported by the vertical guide bumps 50a can be moved vertically, and the vertical guide block 50 allows the guide rail 23 to pivot horizontally around a contact point of the vertical guide bumps 50a.

The cam member 46 rotatably installed on the deck 21 comprises an upper cam block 47 and a lower cam block 48. A first helical cam surface 47a is formed at the bottom of the upper cam block 47 and a second helical cam surface 48a, corresponding to the first cam surface 47a, is formed on the top of the lower cam block 48. The channel is defined between first cam surface 47a and second cam surface 48a. The end portion 23b of the guide rail 23 is inserted in the channel between the first and second cam surfaces 47a and 48a. A hexagonal groove 58 is formed on the upper surface of the upper cam block 47 so that the cam member 46 can be rotated by an Allen wrench or the like.

When the cam member 46 is rotated, the end portion 23b of the guide rail 23 inserted between the first and second cam surfaces 47a and 48a moves vertically along the first and second cam surfaces 47a and 48a. The movement of the guide rail 23 is guided by the vertical guide block 50. Thus, the pickup 25 (see FIG. 2) supported by the guide rails 23 moves vertically so that the tilt of the pickup 25 with respect to the disk can be adjusted.

As described above, in the pickup position and tilt adjusting apparatus, the end portion 23a (see FIG. 3) is moved in a horizontal direction with respect to the disk surface by the position adjusting means 35 and the other end portion 23b (see FIG. 5) is moved in a vertical direction with respect thereto by the tilt adjusting means 45. Thus, the position and tilt of the pickup can be adjusted. The positions of both the position adjusting means 35 and the tilt adjusting means 45 are maintained by frictional force or any other releasable locking device.

As described above, in the pickup position and tilt adjusting apparatus according to the present invention, the position and tilt of the pickup with respect to the disk rotating on a turntable can be adjusted finely so that a focusing and tracking servo mechanism can be more reliable and reproduction efficiency of an optical disk player can be improved. In particular, the present invention can reduce position errors in a high density recording medium such as a DVDP (digital video disk player).

The invention has been described through a preferred embodiment. However, various modifications can be made without departing from the scope of the invention as defined by the appended claims.

What is claimed is:

1. A pickup position and tilt adjusting apparatus of an optical disk player comprising:
   at least one guide rail installed on a deck for supporting and guiding a pickup;
   a position adjusting mechanism including a position adjusting block in which said at least one guide rail is inserted for horizontally moving one end of said at least one guide rail with respect to a disk surface; and
   a tilt adjusting mechanism including a cam member in which said at least one guide rail is inserted for vertically moving the other end of said at least one guide rail with respect to said disk surface.

2. A pickup position and tilt adjusting apparatus of an optical disk player as claimed in claim 1, wherein there are two of said guide rails.

3. A pickup position and tilt adjusting apparatus of an optical disk player as claimed in claim 2 wherein said position adjusting mechanism comprises:
   a horizontal guide block for supporting said one end of said at least one guide rail so that said at least one guide rail can be moved horizontally with respect to said disk surface; and
   wherein said position adjusting block for horizontally moving said at least one guide rail by a predetermined amount comprises a cylindrical block having a cut-out sector into which said one end of said at least one guide rail is inserted.

4. A pickup position and tilt adjusting apparatus of an optical disk player as claimed in claim 3, wherein horizontal guide bumps are formed lengthwise on surfaces inside said horizontal guide block for minimally contacting upper and lower surfaces of said at least one guide rail.

5. A pickup position and tilt adjusting apparatus of an optical disk player as claimed in claim 3, wherein said tilt adjusting mechanism comprises:
   a vertical guide block for supporting said other end of said at least one guide rail so that said at least one guide rail can be moved vertically with respect to said disk surface; and
   wherein said cam member for vertically moving said at least one guide rail has a helical first cam surface and a second cam surface opposing said first cam surface, wherein said other end of said at least one guide rail is inserted between said first and second cam surfaces.

6. A pickup position and tilt adjusting apparatus of an optical disk player as claimed in claim 5, wherein vertical guide bumps are formed lengthwise on surfaces inside said vertical guide block for minimizing an area of contact between side surfaces of said at least one guide rail and said vertical guide block.

7. A pickup position and tilt adjusting apparatus of an optical disk player as claimed in claim 2, wherein said tilt adjusting mechanism comprises:
   a vertical guide block for supporting said other end of said at least one guide rail so that said at least one guide rail can be moved vertically with respect to said disk surface; and
   wherein said cam member for vertically moving said at least one guide rail has a helical first cam surface and a second cam surface opposing said first cam surface so that said other end of said at least one guide rail is inserted between said first and second cam surfaces.

8. A pickup position and tilt adjusting apparatus of an optical disk player as claimed in claim 7, wherein vertical guide bumps are formed lengthwise on surfaces inside said vertical guide block for minimizing a contact area between side surfaces of said at least one guide rail and said vertical guide block.

9. A pickup position and tilt adjusting apparatus of an optical disk player comprising:
   at least one guide rail installed on a deck for supporting and guiding a pickup;
   a position adjusting mechanism for horizontally moving one end of said at least one guide rail with respect to a disk surface; and a tilt adjusting mechanism for vertically moving the other end of said at least one guide rail with respect to said disk surface;

wherein said position adjusting mechanism comprises:

a horizontal guide block for supporting said one end of said at least one guide rail so that said at least one guide rail can be moved horizontally with respect to said disk surface; and a position adjusting block for horizontally moving said at least one guide rail by a predetermined amount, said position adjusting block comprising a cylindrical block having a cut-out sector into which said one end of said at least one guide rail is inserted.

10. A pickup position and tilt adjusting apparatus of an optical disk player comprising:

at least one guide rail installed on a deck for supporting and guiding a pickup;

a position adjusting mechanism for horizontally moving one end of said at least one guide rail with respect to a disk surface; and a tilt adjusting mechanism for vertically moving the other end of said at least one guide rail with respect to said disk surface;

wherein said tilt adjusting mechanism comprises:

a vertical guide block for supporting said other end of said at least one guide rail so that said at least one guide rail can be moved vertically with respect to said disk surface; and a cam member for vertically moving said at least one guide rail, said cam member having a helical first cam surface and a second cam surface opposing said first cam surface so that said other end of said at least one guide rail is inserted between said first and second cam surfaces.

* * * * *